Patented Apr. 29, 1947

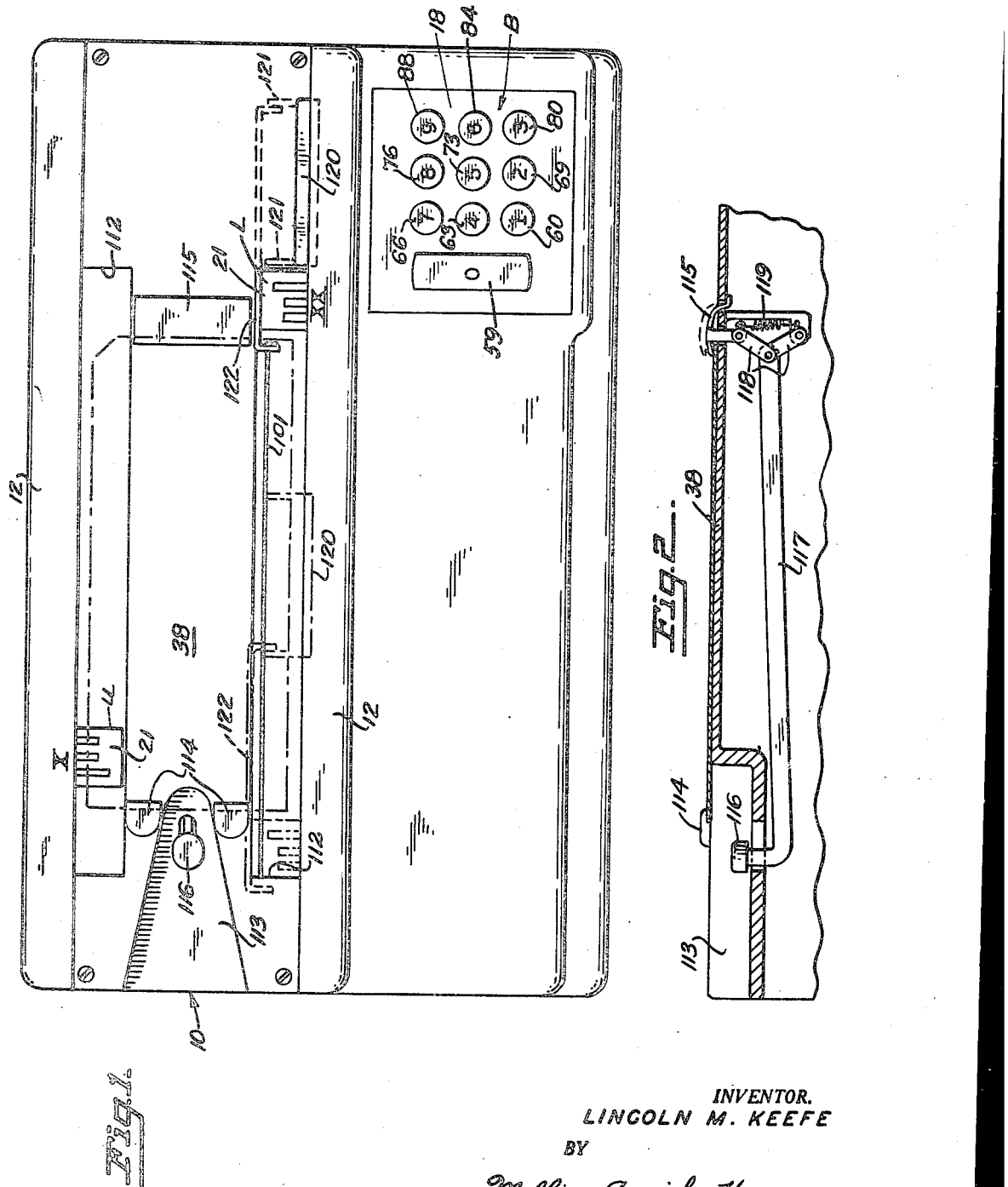

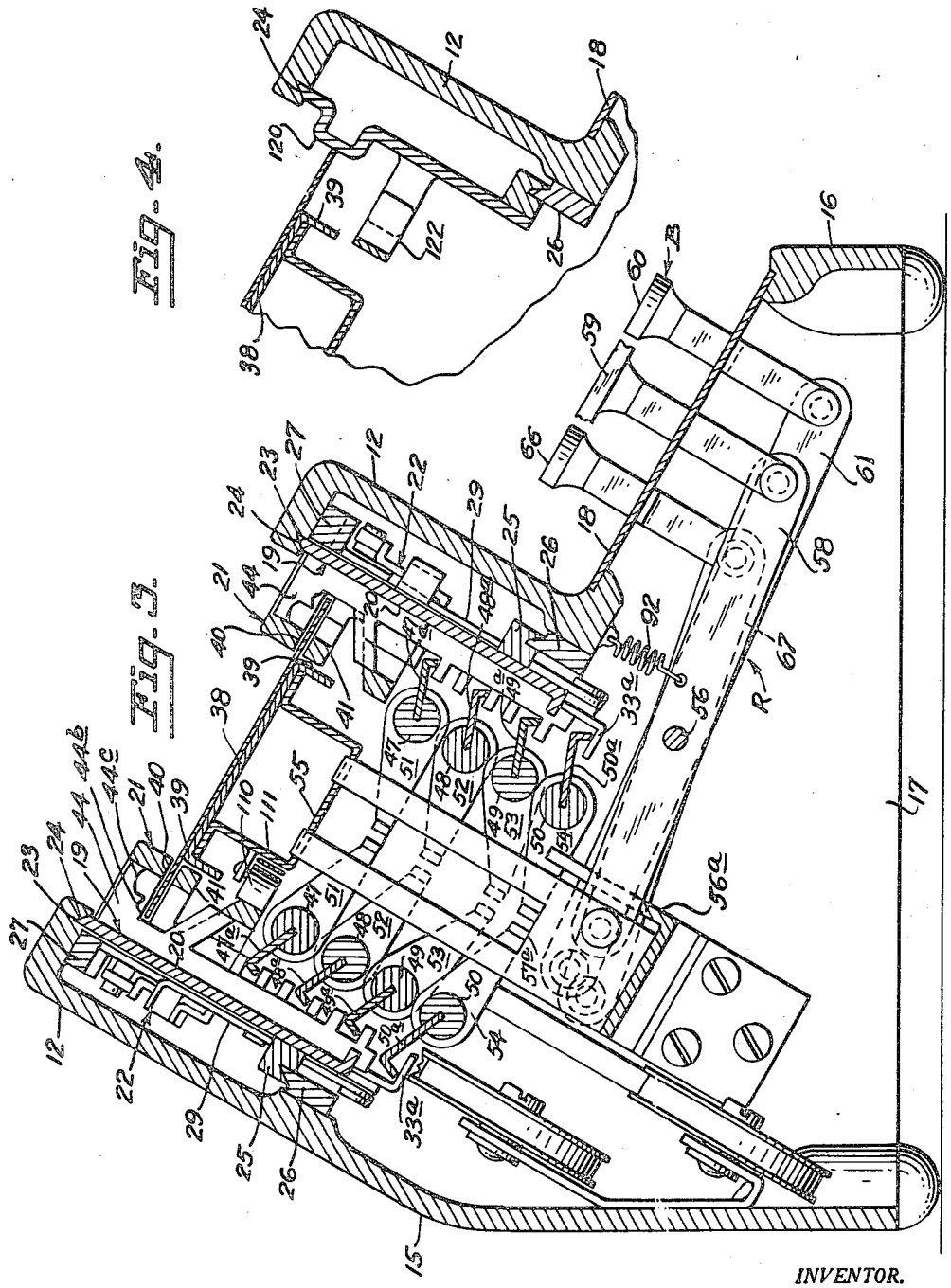

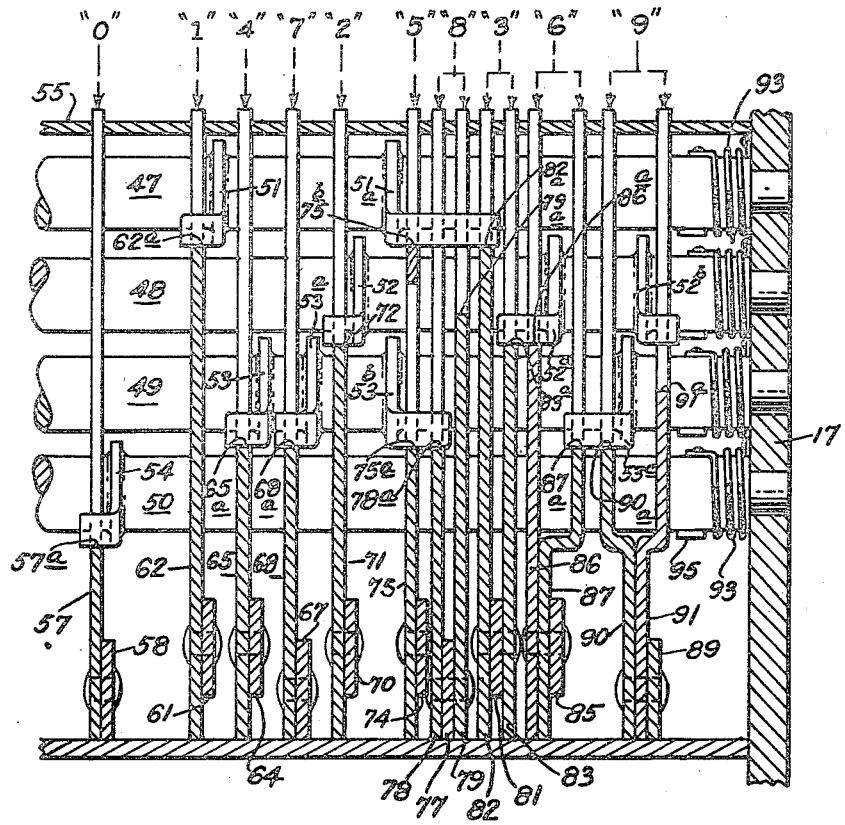
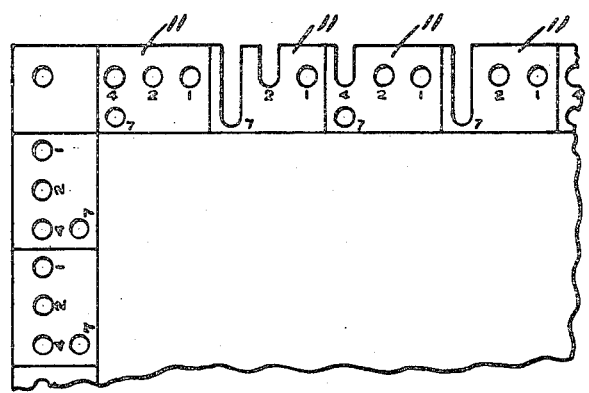

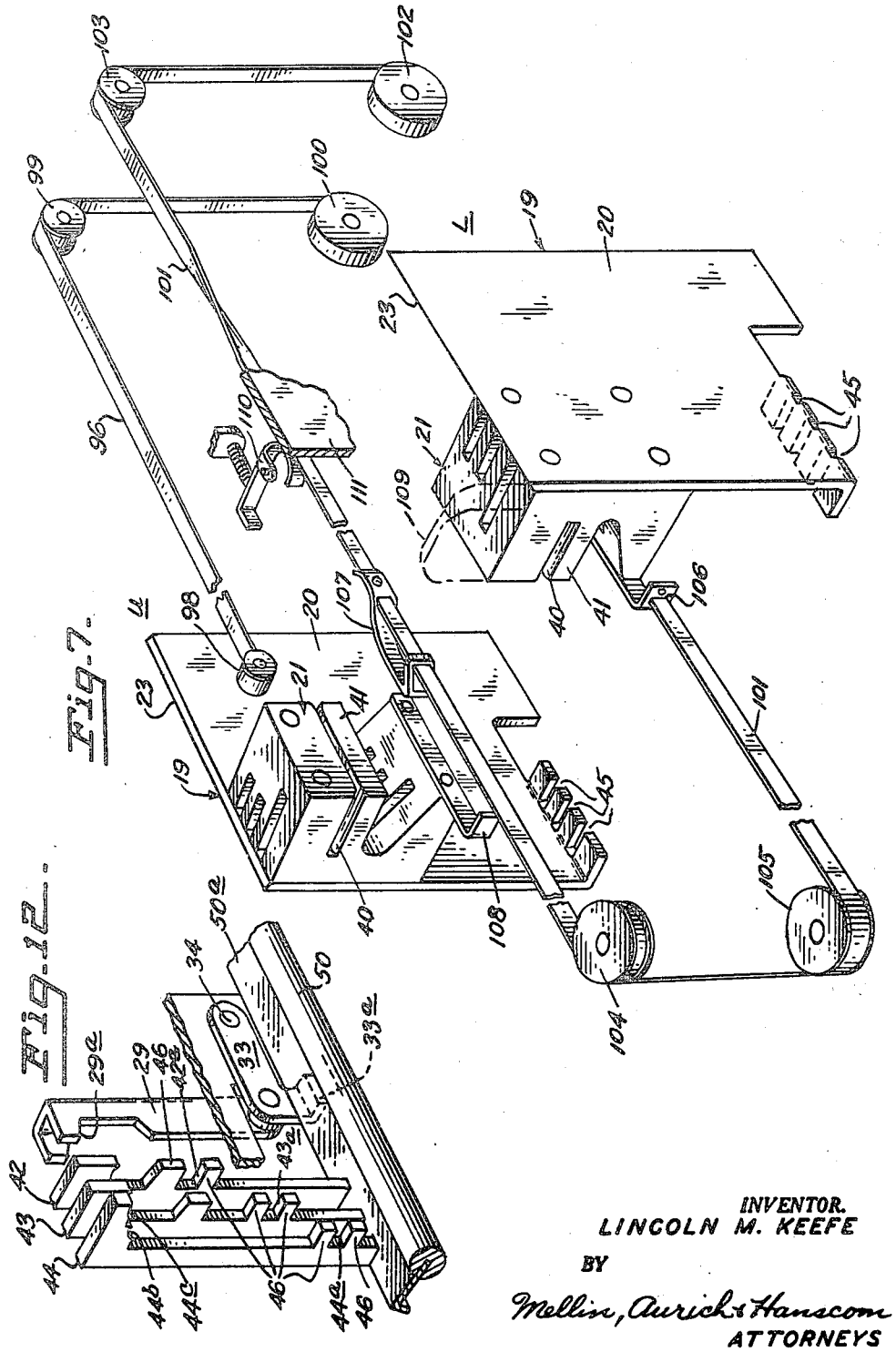

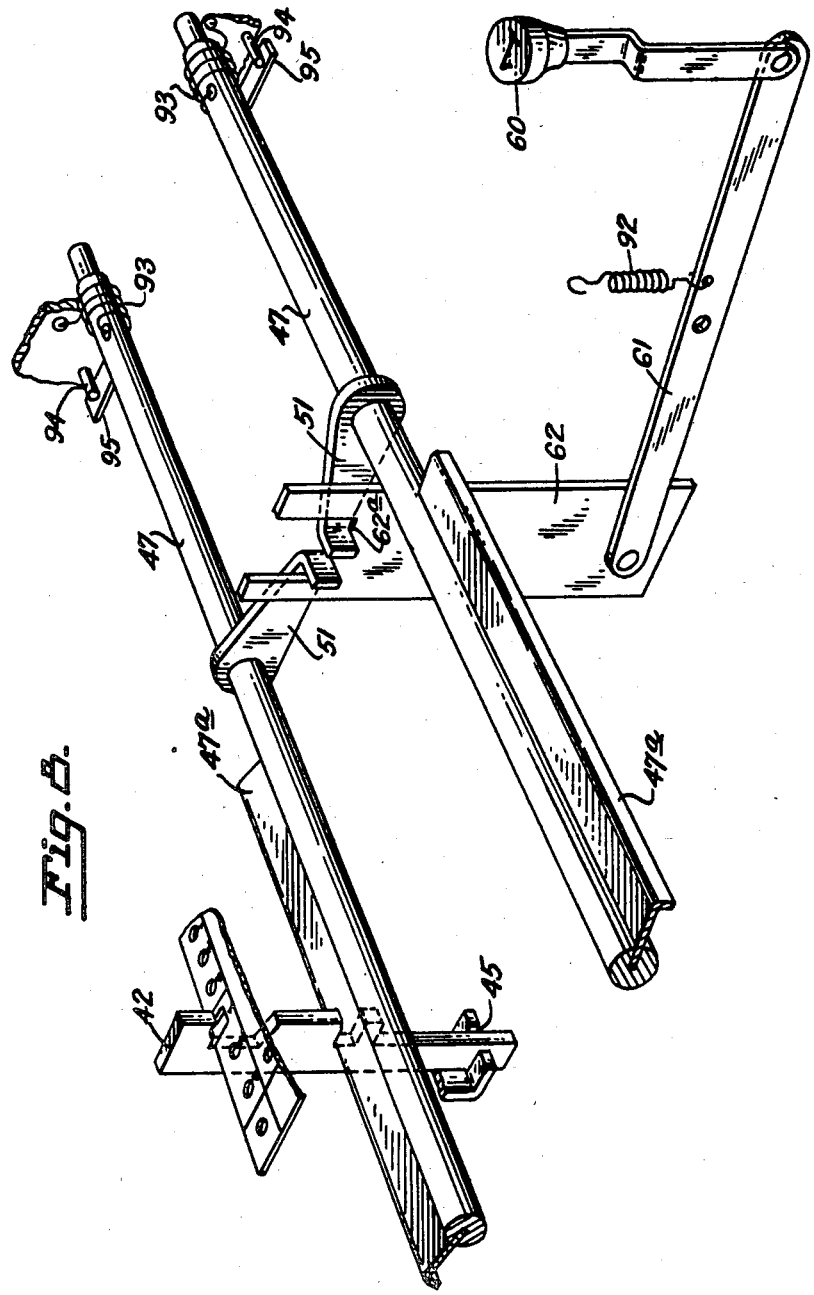

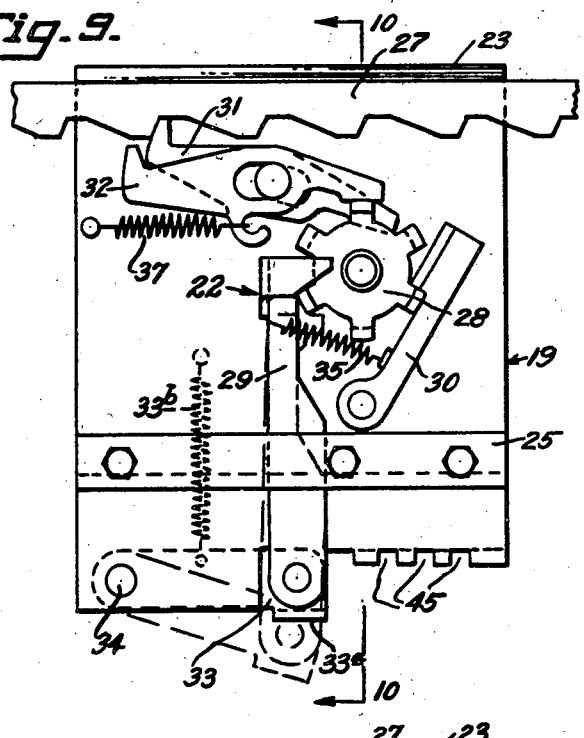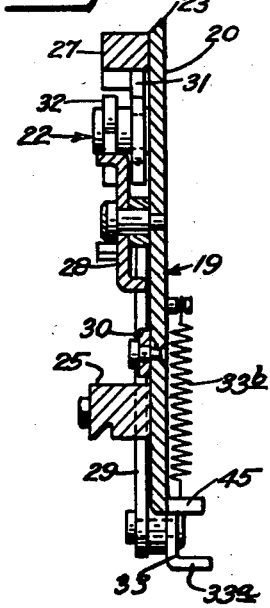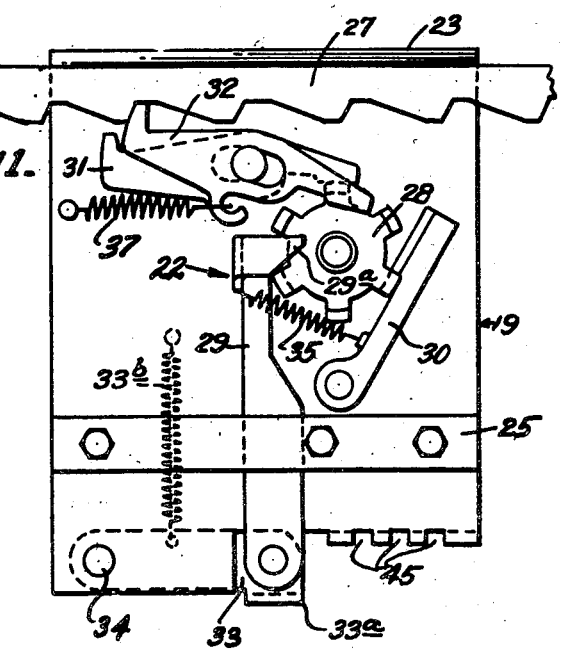

2,419,781

UNITED STATES PATENT OFFICE 2,419,781

KEY OPERATED CARD PUNCHING MACHINE

Lincoln M. Keefe, Brooklyn, N. Y., assignor to The McBee Company, Athens, Ohio, a corporation Application August 23, 1945, Serial No. 612,156

18 Claims. (Cl. 164—112)

This invention relates to key operated machines for marginally slotting or notching cards, prepunched near the margin with the circular sorting holes.

In general, cards or checks of the near marginally punched type are provided with a series of holes or perforations along all four marginal zones of the card. These perforations are usually grouped into fields arranged longitudinally of the card edge, each field representing a single digit. In one type of such card, each field includes four perforations numbered "1," "2," "4" and "7." To punch in or indicate in the card edge one of those numbers, the card is slotted out to the card edge from the perforation identified by that number. However, to indicate the numbers "3," "5," "6," "8" and "9," two of the perforations, whose numbers combine to add up to that number, must be slotted out to the card edge. For example, to indicate "3" on the card edge, in the selected field, perforations "1" and "2" are slotted out. To indicate "0" no notching is effected at all, the blank field indicating "0."

To economize on card edge space, cards such as above have been provided, in which each field has four of such perforations arranged with three of them or, that is, the perforations numbered "1," "2" and "4," parallel and close to the card edge and with the perforation number "7" spaced inwardly of the card edge and the other perforations, but in alignment on a line perpendicular to the card edge with the perforation numbered "4." Therefore, to indicate the number "4," the slot or notch extends inwardly only to the perforation numbered "4," but to indicate the numeral "7," the slot or notch extends farther inwardly or to the perforation number "7." Thus, slots of two depths must be made to enable complete indication of the numerals "1" to "9," inclusive, in any one field.

It is the principal object of my present invention to provide an improved and simplified machine in which a card of the character referred to may be inserted and which is key operable to enable the opposite longitudinal edges of the card to be rapidly and acurately slotted out in the desired pattern progressively through all of the fields along the said card edges.

It is a further object of my present invention to provide a machine of the character referred to which is comparatively simple in construction and efficient in operation and unlikely to become out of operating condition.

One form which the invention may assume is exemplified in the following description and illustrated by way of example in the accompanying drawings, in which:

Fig. 1 is a plan view of a machine embodying the preferred form of my invention.

Fig. 2 is a fragmentary view in longitudinal section through a portion of the machine disclosing the latch means for maintaining a card in operative position on the machine.

Fig. 3 is a transverse sectional view through the machine disclosing its construction.

Fig. 4 is a fragmentary view in transverse section showing the means for aligning the card in operating position.

Fig. 5 is a view in vertical section through the machine showing the construction of certain portions of the operating mechanism which enables the proper slotting to be effected by the use of ten keys.

Fig. 6 is a fragmentary view of one type of card which may be slotted out by the machine here disclosed.

Fig. 7 is a perspective view somewhat diagrammatic in character showing the manner in which the two die heads are connected for positioning.

Fig. 8 is a perspective view somewhat diagrammatic in character showing the manner in which the keys for digits 1 to 9, inclusive actuate the selected dies.

Fig. 9 is a view in elevation of the escapement mechanism.

Fig. 10 is a view in vertical section therethrough taken on line 10—10 of Fig. 9.

Fig. 11 is a view similar to Fig. 9 except showing the escapement mechanism in a different position.

Fig. 12 is a skeletonized perspective view showing the manner in which the slotting punches are actuated and also disclosing the manner in which the escapement mechanism is actuated to move the selected punch head from one field of the card to the succeeding field of the card.

Referring more particularly to the accompanying drawings, 10 indicates a card slotting or notching machine which is key operated to notch cards of the type commonly known in the industry as "Keysort" cards. One type of these "Keysort" cards is illustrated in Fig. 6, where it is seen that the card edge is divided into a plurality of longitudinally arranged fields 11. Each field includes four perforations which are identified as "1," "2," "4" and "7." The perforations identified by "1," "2" and "4" are arranged at spaced distances apart in a row disposed longitudinally of and parallel to the card edge at a spaced distance from that edge. The perforation identified by "7" is spaced inwardly from the perforation identified as "4" in alignment therewith in a direction perpendicular to the card edge.

The fields of a card of this type are ordinarily arranged (commencing at the right-hand edge) with a unit field and succeeding fields identified as tens, hundreds, thousands, ten thousands, and hundred thousands, etc. Assuming that a card has six fields along its edge, a number as high as 999,999 can be punched or notched into the edge of the card. Assuming that the number to be notched into the edge of the card is 987,543, the number "9" would be notched into the first field at the left end of the card, and the remaining numbers would be successively notched into the remaining fields of the card edge. If a zero occurs in the number, no notching is effected in the field where the zero occurs and the lack of notching indicates "0."

It will be noticed that there are only four perforations in each field, but these perforations must be notched to indicate any number from "1" to "9," inclusive. Thus, to indicate certain numbers two perforations must be notched out. To indicate the numbers "1," "2" and "4," these perforations are notched out to the edge of the card singly. To indicate the numeral "7," a deeper notch or slot must be made which slots through the "4" perforation and into the "7" perforation. However, to indicate the numerals "3," "5," "6," "8" and "9," two perforations must be slotted out. For example, to indicate the numeral "3," perforations "1" and "2" must be slotted out. To indicate the numeral "5," perforations "1" and "4" must be slotted out. To indicate the numeral "6," the "4" and "2" perforations must be notched out. To indicate the numeral "8," the "7" and "1" perforations must be notched out, and to indicate the numeral "9," the "7" and "2" perforations must be notched out. Thus, it will be seen that each field is arranged so that it may be notched or slotted out to indicate a single digit from "1" to "9," inclusive.

The present machine is adapted, by the operation of ten keys which are numbered zero to nine, as illustrated in Fig. 1, to progressively notch out the selected digit in the fields 11 at the edge of the card. That is to say, assuming that the card has six fields and using the number heretofore pointed out, to-wit, 987,543, depression of the "9" key will slot out the "7" and "2" perforations in the hundred thousands field, and subsequent depression of the other keys corresponding with the remaining digits will appropriately slot out the remaining fields so that the card edge will be slotted out to indicate the number 987,543. When a zero occurs in a number, the zero button is pressed so that no notching is effected in that particular field.

In general, the machine 10 comprises a rigid frame which includes a pair of front and rear punch-head carriage guides 12 which extend longitudinally of the frame in parallelism at a spaced distance apart. These carriage guides 12 are in absolute longitudinal alignment in a plane, and they are arranged so that their plane is on an acute angle to the horizontal so that a card disposed between them for notching is in a more direct full view of the machine operator. The rear carriage guide 12 is formed as an extension of a rear frame plate 15.

The frame also includes a front frame plate 16 and end frame plates 17. The carriage guides 12, the rear and front plates 15 and 16, and the end frame plates 17 are preferably integrally formed, so as to provide a very rigid frame structure. The front frame plate 16 is spaced forwardly of the carriage guide 12, and a keyboard 18 is fitted therebetween which lies in a plane disposed at ninety degrees to the carriage guide 12, or in a plane parallel to the plane on which the card to be notched will be disposed between the carriage guides 12.

Each carriage guide 12 is fitted with a punch carriage 19. As each punch carriage 19 and each of the carriage guides 12 are precisely alike, except that one is right hand and one is left hand, only one will be described.

Reference being had to Figs. 7, 9, 10 and 11, it will be seen that each punch carriage 19 is formed of a flat carriage plate 20 on which is fixedly mounted a punch head 21 and an escapement mechanism 22. The carriage 19 is mounted in its guide 12 for movement longitudinally thereof, and is guided for such movement by engagement of the upper edge 23 of the carriage plate 20 with a guide groove 24 in the guide 12. Adjacent its lower end the carriage plate 20 is formed with a guide shoe 25 engaging a guide rail 26 fixed in the carriage guide 12. This mounting of the carriage plate 20 in the guide 12 accurately guides the carriage 19 for longitudinal movement in the guide 12.

At the exterior side of the carriage plate 20 and adjacent the upper end of the carriage guide 12, the latter is fitted with a fixed but interchangeable escapement rack or skip bar 27 which, of course, extends longitudinally of the guide 12 and parallel to the path of movement of the carriage 19. The pattern of the teeth of the escapement rack, of course, is equal to the spacing of the fields on the card edge to be notched, and inasmuch as this escapement rack is removably fixed to the guide 12, different racks may be provided to correspond with cards of different field arrangements. It should be pointed out here that although I have disclosed one specific card with a particular arrangement of perforations, it should be understood that cards having perforations differently arranged than those shown may be employed and that my invention is applicable to cards of various field and perforation arrangements.

It is intended that each time a key is depressed to notch out one field, the escapement mechanism 22 be automatically actuated to permit the carriage to advance one position or field and register with the succeeding field. This is accomplished automatically, as will be further described herein, by causing operation of the escapement mechanism associated with the rack 27 so that after each key has been depressed and that particular field has been notched, the escapement mechanism will permit the carriage 19 to advance one tooth along the escapement rack 27 and thereby align with the succeeding field 11.

The escapement mechanism is mounted at one side of the carriage plate 20 for cooperation with the escapement rack 27. Referring to Figs. 9, 10 and 11 of the drawings, it will be seen that the escapement mechanism includes an escapement wheel 28 associated with which is an escapement pawl 29, a latch pawl 30 and a pair of detent levers 31 and 32. It will be noticed that the escapement wheel 28 has six teeth which extend axially but alternately in opposite directions so that the detent levers 31 and 32 are alternately operated by alternate teeth on the escapement wheel 28. The escapement pawl 29 and the latch pawl 30, however, are capable of engaging all of the teeth.

The escapement pawl 29 is connected to one end of an escapement lever 33 pivoted at its opposite end to the carriage plate 20 as at 34. A spring 35 connects the pawls 29 and 30 together and constantly but yieldingly urges them into engagement with the teeth of the escapement wheel 28. A spring 33b constantly urges the escapement lever 33 upwardly to maintain the pawl 29 in its uppermost position. A spring 37 constantly urges the detent levers 31 and 32 into engagement with the ratchet type teeth of the escapement rack 27.

It should be stated that on each operation of a key of the machine, the escapement lever 33 is depressed so as to draw the pawl 29 downwardly for the first half of its cycle of operation. When the pawl 29 is drawn downwardly, it does not effect rotation of the detent or escapement wheel 28 due to the provision of the latch paw 30 and due to its cam surface 29a which enables the working end of the pawl 29 to ride off of an interposed tooth of the escapement wheel 28. However, when the pawl 29 reaches the lower end of its first stroke, its end will pass off of the adjacent tooth and due to the spring 35, its upper extremity will be positioned at the under side of that tooth so that when the spring 33b returns the escapement lever 33 and the pawl 29 through the second half of the cycle of operation of the latter, the escapement wheel 28 will be rotated one-sixth of a revolution.

It should be pointed out that the escapement wheel is provided with six teeth, three in register with the detent lever 31 and three in register with the detent lever 32. As the escapement wheel 28 rotates through one-sixth of a revolution, one of the detent levers will be released so that it may engage the succeeding ratchet tooth on the escapement rack, and thereafter the other detent lever is disengaged from the escapement rack so that the carriage may move along the escapement rack until the detent lever which had been released engages the succeeding tooth. Thus, it is seen that each time a key is actuated to perform an operation, the escapement wheel 28 is revolved one-sixth of a revolution, conditions one detent lever to engage the succeeding tooth on the escapement rack, and shortly thereafter positively moves the other detent lever from engagement with the rack so that the carriage may advance one tooth along the rack. This advance, as will be hereinafter described, is effected by spring means associated with the punch carriage 19.

At the side of the carriage plate 20 opposite the escapement mechanism is fixed the punch head 21. The punch heads 21 on the two carriages 19 face each other and are adapted to simultaneously receive the opposite longitudinal edges of a card inserted in the machine for notching.

It is seen that on the frame between the carriage guides 12 is fixed a stationary card receiving platform 38 which extends longitudinally of the carriage guides 12 in parallelism therewith. The side edges 39 of the card receiving platform 38 are spaced from the guides 12 a distance permitting the punch heads 21 to travel therebetween. The card receiving surface of the card receiving platform 38 which, of course, is the upper surface thereof, is on a plane perpendicular to the carriage plates 20.

Each punch head 21 is formed with a card receiving slot 40, the lower surface of which is in approximately the same plane as the plane of the upper surface of the card receiving platform 38 so that a card may be disposed flatwise on this platform with its opposite longitudinal edges inserted into the card receiving slots 40 of the punch heads 21.

The portion of each punch head 21 below the slots constitutes a female die 41 for cooperation with punches or male dies 42, 43 and 44. The male dies are actually the slotting or punching dies, the female die 41 being formed with slots corresponding in contour to the slotting die faces of the male dies. The male dies are movable in a path perpendicular to the path of movement of the carriage and, of course, perpendicular to the card receiving surface of the card receiving platform 38. The male dies are guided in the punch head 21 above and below the female die 41 and are also guided at their lower ends in guide slots 45 formed in the lower end of the carriage plate 20, as illustrated.

The male die 42 is designed to notch out the number "1" perforation. The male die 43 is to notch out the "2" perforation, and the male die 44 is to notch out the "4" and "7" perforations. The male die 44 has a die face 44b to notch out the "4" perforation and a die face 44c to notch out the "7" perforation, which faces are longitudinally offset, as illustrated. This is so because when the "7" perforation is to be notched out, the male die 44 is given a longer cutting stroke than when it is to notch out only the "4" perforation. That is to say, if the "4" perforation is to be notched out, a punching stroke is given to the male die 44 only sufficient to notch out the "4" perforation without notching out the "7" perforation, and if the "7" perforation is to be notched out, the stroke of the male die is lengthened so that that result is effected.

Each male die 42, 43, and 44 is formed with an operating socket 42a, 43a and 44a. These sockets are disposed at relatively different locations longitudinally on the three male dies and are located between laterally projecting lugs 46 formed as part of the said dies, as illustrated.

To selectively actuate the male dies, I provide a set of rock shafts 47, 48, 49 and 50, one set being provided for operation in conjunction with each carriage. Inasmuch as these rock shafts are identical in construction and operation, and in their relative arrangement with respect to each carriage, but one will be described herein.

It should be pointed out here that the rock shaft 50 is not employed to actuate a die, but is employed when the zero key is depressed to cause actuation of the escapement mechanism only and to move the carriage to the next succeeding field position on the card. The rock shafts 47, 48 and 49, however, actuate the male dies to perform the punching or slotting operation. The rock shaft 47 is for actuating the die 42, the rock shaft 48 is for actuating the die 43, and the rock shaft 49 to actuate the die 44.

The rock shafts 47, 48, 49 and 50 are arranged in parallelism longitudinally of the machine and in parallelism with the path of movement of the carriage. These shafts are spaced equal distances apart vertically.

Each rock shaft is formed with a radially projecting actuating blade which is downturned at its outer edge, as illustrated. The male die actuating blade of rock shaft 47 is indicated by 47a. The male die actuating blade of the rock shaft 48 is indicated by 48a. The male die actuating blade of rock shaft 49 is indicated by 49a, and the escapement die actuating blade of rock shaft 50 is indicated by 50a. These blades extend longitudinally of the rock shafts throughout the complete distance of the travel of its associated punch head, so that at all times the socket 42a of the member 42 will be in engagement with the actuating blade 47a, and the socket 43a will be engaged at all times with the male die actuating blade 48a, and at all times the socket 44a will be engaged with the male die actuating blade 49a. The escapement actuating blade 50a of the rock shaft 50 is of a similar length so that an inturned ear or lug 33a of lever 33 will at all times be in register therewith for actuation thereby.

It should be pointed out here that if a field 11 on the card is to be skipped to indicate zero, the zero key is depressed, which, as will be described, actuates the rock shaft 50 to cause its actuating blade 50a to depress the ear or lug 33a of lever 33. This actuates the escapement mechanism, as previously described, to permit advance of the carriage one field position, and place it in operating position with respect to the succeeding field.

However, it is necessary that after each punching operation the escapement mechanism be likewise actuated to permit the carriage to advance to the next field position. To accomplish this, the lower ends of the male dies 42 to 44, inclusive, are in such a relative position with respect to the actuating blade 50a on the rock shaft 50 that when they are projected downwardly through a punching operation, they will engage the outer end of the actuating blade 50a and effect operation of the escapement mechanism precisely as if the zero key was depressed or actuated.

Thus, it will be seen that the carriage may move longitudinally with respect to the rock shafts 47 to 50, inclusive, and with respect to the actuating blades 47a to 50a, inclusive, while the male dies will be maintained in operative condition with respect thereto so that regardless of the point of location of the carriage longitudinally of the card to be operated upon, operation of the respective rock shafts will actuate the male dies to perform the punching operation and will actuate the escapement mechanism to advance the said dies to the succeeding field position.

It should be pointed out here that both sets of rock shafts are simultaneously actuated regardless of whether or not one punch carriage and its associated punch mechanism is located in an inoperative position, because when it is in an inoperative position, it is not in register with the card and, therefore, actuation of the male dies does not effect any actual punching.

To actuate the rock shafts and thus effect operation of the selected male dies, the rock shafts are formed with inwardly projecting actuator levers 51, 52, 53 and 54. The actuator levers 51 are fixed on the rock shafts 47. The actuator levers 52 are fixed on the rock shafts 48. The actuator levers 53 are fixed on the rock shafts 49 and the actuator levers 54 are fixed on the rock shafts 50.

When the "1" perforation in the card is to be notched, the inner ends of the levers 51 are elevated to depress the blades 47a and actuate the male dies 42. When the number "2" perforation is to be slotted out, the inner ends of the levers 52 are elevated to actuate male dies 43. When the perforations "4" and "7" are to be notched out, the inner ends of the levers 53 are elevated to actuate the male dies 44. When one field position is to be skipped to indicate zero, the inner ends of the actuator levers 54 are elevated to operate only the escapement mechanism.

It should be pointed out, however, that each time any selected male die is operated, the actuator blades 50a are actuated to effect operation of the escapement mechanism so that the carriage in operation will move to the next field position.

Obviously, in order to punch two slots simultaneously in any one field to indicate any one of the numbers "3," "5," "8" or "9," it is necessary that appropriate rock shafts be operated to effect such movement. For example, to effect notching of the numeral "3" into the card edge, it is necessary to actuate the rock shafts 47 and 48. Likewise, to notch in the numeral "5" into the field, it is necessary to actuate rock shafts 47 and 49. To notch in the numeral "6" into the card rock shafts 48 and 49 must likewise be actuated, and to notch in the numeral "8," the rock shafts 47 and 49 must be actuated.

To notch out the numeral "9" in the card, the rock shafts 48 and 49 must be operated. To accomplish this actuation by the depression of the keys, I have provided a series of lifter plates which are arranged for vertical reciprocating movement centrally between the rock shafts for movement in a direction perpendicular to the plane of the card receiving platform 38. The upper ends of these plates are guided for this reciprocation in a guide plate 55 disposed in a fixed position beneath the platform 38.

These lifter plates are connected with key levers indicated by the letter R in Fig. 3, which are pivoted about a common pivot rod 56 which extends longitudinally of the machine and carried by the frame thereof. The key levers R are in turn connected with keys indicated by B in Fig. 3, which project from the keyboard. As previously stated, there are ten keys which are numbered from zero to nine, inclusive, as illustrated in Fig. 1. The key levers R are guided in a comb plate 56a as shown.

A lifter plate 57 is connected by a key lever 58 to the zero key 59 so that by depression of the zero key 59, the lifter plate will move endwise upwardly and operate the actuator levers 54 to rotate the rock shafts 50 sufficiently to cause the actuator blades 50a to operate the escapement mechanism. It is seen that all of the actuator levers 51 to 54, inclusive, are provided with laterally turned ends to engage a transverse abutment on their associated lifter plates. The transverse abutment on the lifter plate 57 is indicated by the numeral 57a.

The "1" key, indicated at 60, is connected by a key lever 61 to a lifter plate 62 which has an abutment 62a for engaging levers 51 for actuating the rock shafts 47 so that the actuator blades 47a thereof will actuate the punches 42 and thereby slot out the "1" perforation in the field of the card which is being operated upon.

The "4" key 63 is connected with a key lever 64 which in turn is connected to a lifter plate 65 for engaging the actuator levers 53 by means of its abutment 65a so that depression of the "4" key will similarly operate the rock shafts 49 to actuate the blades 49a and thus operate the male dies 44 an amount sufficient to slot out the "4" perforation to the edge of the card, but insufficient to slot out the "7" perforation to the edge of the card.

The "7" key 66 is connected to a key lever 67 in turn connected to a lifter plate 68 having an abutment 68a so that depression of the "7" key will actuate levers 53a to likewise turn the rock shafts 49 and thus actuate the male dies 44 to slot out the "7" perforation to the edge of the card. Obviously, on the first part of the stroke, when the "7" key is depressed, the "4" perforation will be punched out, but this will be followed immediately by punching out of the "7" perforation. Depression of the "7" key imparts a greater amount of turning movement to the rock shafts 49 than does depression of the "4" key. This is due to a difference in lengths of the respective levers between their pivotal points and the keys and the pivotal point and the point of connection with the lifter. The lifter plate 68 is given a greater amount of movement vertically in order to punch out the "7" perforation than is imparted to the lifter plate 65 to punch out the "4" perforation. This will be obvious from Figs. 3 and 5. Consequently, in punching out the "4" perforation, the rock shafts 49 are turned a distance less than they are turned when punching out the "7" perforation.

To punch out the "2" perforation on the card, the "2" key 69 is connected to a key lever 70 which in turn is connected to a lifter plate 71 having an abutment 72 engaging the actuator levers 52 to rock the rock shafts 48, and thereby actuate the blades 48a to operate the male dies 43.

To notch out the numeral "5," it is obvious that the male die 44 and the male die 42 must be simultaneously operated to notch out perforations "4" and "1" on the card, and for this reason the "5" key 73 is connected by a key lever 74 to a lifter plate 75. The lifter plate 75 has two spaced abutments 75a and 75b. The abutment 75a is to engage actuator levers 53b which are similar to the actuating levers 53 and similarly fixed on the rock shafts 49. The abutment 75b engages an actuator lever 51a which is similar to the actuator levers 51 and are likewise fixed on the rock shafts 47.

By this arrangement, when the "5" key 73 is depressed, the actuator levers 53b and 51a are simultaneously actuated to rock the shafts 47 and 49 to slot out both the "4" and the "1" perforations in the card. The amount of movement given the lifter plate 75 by depression of the "5" key 73 is only sufficient to notch out the "4" perforation and insufficient to notch out the "7" perforation in the card.

To notch out the numeral "8" in a field on a card, the "8" key 76 is connected with a key lever 77 which is connected to two lifter plates 78 and 79. The abutment 78a on the lifter plate 78 engages the actuator levers 53b so that on depression of the "8" key, the rock shafts 49 will be actuated an amount sufficient to punch out the "7" perforation on the card. The key lever 77, like the key lever 67, imparts a longer stroke to the lifter plates in order that the male dies 44 will punch out the "7" perforation. Simultaneously, the lifter plate 79 will be elevated to actuate the actuator levers 51a through an abutment 79a. However, this abutment is normally spaced downwardly from the turned ends of the levers 51a so that there will be a certain amount of lost motion at the commencement of the depression of the "8" key, so that the rock shafts 47 will only be turned a sufficient amount to properly operate the dies 42, thus accommodating the extra amount of movement which must be imparted to the rock shafts 49 to punch out the "7" perforation.

To punch out "3" in the card edge of the selected field, the "3" key 80 is connected to a key lever 81 which likewise is connected to two lifter plates 82 and 83. The lifter plate 82 has an abutment 82a which engages the actuating levers 51a to actuate the punch or male dies 42, while the lifter plate 83 has an abutment 83a to engage actuator levers 52a to simultaneously rock the shafts 48 and actuate the male dies 43. The actuator levers 52a are similar to the levers 52 and are similarly secured on the rock shafts 48.

To punch out numeral "6" in the card field, the perforation "4" and the perforation "2" must be notched out to the card edge. For this reason, the "6" key 84 is connected by a key lever 85 to two lifter plates 86 and 87. The lifter plate 86 has an abutment 86a engaging the actuator levers 52a so that depression of the "6" key will, through the medium of the lifter plate 86, actuate the rock shafts 48 and operate the dies 43 to slot out the "2" perforation of the card. Simultaneously an abutment 87a on the lifter plate 87 will engage actuator levers 53c and actuate the rock shafts 49 sufficiently to punch out the "4" perforation in the card.

To punch or slot out the numeral "9" in the field, the "9" key 88 is connected by a key lever 89 to two lifter plates 90 and 91, as illustrated. The lifter plate 90 has an abutment 90a engaging the actuating levers 53c to actuate the rock shafts 49 a sufficient distance to punch out the perforation in the card. It should be pointed out that the key lever 89, like the key levers 67 and 77, imparts a long stroke to its connected lifter plates; that is, a stroke sufficiently long to actuate the dies 44 to punch out the "7" perforation. The lifter plate 91 has an abutment 91a to engage actuator levers 52b which are similar to the actuating levers 52 and 52a. However, the abutment 91a is spaced below the normal position of the actuator levers 52b so that there is lost motion at the commencement of the upward stroke of the lifter plates so as to impart a normal amount of turning movement to the rock shafts 48 and thus accommodate the additional swinging movement of the key lever 89. Thus, depression of the "9" key will cause slotting of the card at the "7" perforation and at the "2" perforation, thus indicating "9" in the field.

For the purpose of convenience, in Fig. 5 I have indicated the various lifter plates which are associated with the various numbers to be slotted out in a field. It should be pointed out and it can be readily understood that the keys are laterally offset beneath the keyboard in order that they may be grouped in the arrangement shown in Fig. 1 and yet be properly connected to their associated key levers.

In Fig. 8 is most clearly illustrated the precise manner of the operation of the keys, the key levers, the lifter plates and the rock shafts. It should be stated that springs 92 are connected to the key levers to elevate the keys after an operation, and that springs 93 are associated with all of the rock shafts to return the parts to normal position after each operation. Stop means to relocate the rock shafts at their proper normal position after an operation are provided, as illustrated in Fig. 8. Such stop means are provided for each rock shaft.

The stop means comprises a pin 94 fixed in the end plate adjacent the rock shaft and a lug 95 is fixed to the rock shaft. In normal position, the lug 95 engages its associated pin 94 at the time the rock shafts assume normal or rest position. It is seen that in operation, the lug 95 moves away from its associated pin 94.

As previously pointed out, there are two punch carriages 19 and two punch heads 21. However, only one of these functions at a time. That is to say, the operator punches along the upper marginal edge of the card, and after that operation is completed, he punches along the lower edge of the card with the other carriage and punch head 21. In Fig. 1, I have indicated the upper carriage and punch head by the letter U and the lower punch head and carriage by the letter L. In this figure I have shown the upper punch head U in position to commence an operation shown with the upper punch head U in the position indicated at X, and the lower punch head L in the position indicated at XX. In the position X the upper punch head U is in correct register with the first field of the upper longitudinal edge at the left-hand end of the card, which in the instance of six fields would be in the hundred thousands field. The lower punch head L is an inoperative position with respect to a card when it is in the position XX.

To constantly urge the upper punch head U and its carriage from left to right so that it will advance intermittently or step by step from one field to the succeeding field across the card as the machine is operated, I provide a steel tape 96 (see Fig. 7), one end of which is fixed to the upper carriage U, as at 98, and is led over an idler roller 99 to a spring reel 100, which spring reel is of standard construction constantly tending to reel up the tape 96 and thus draw the upper carriage U from left to right.

A second steel tape, or that indicated by 101, is connected at one end with a spring reel 102 and led over an idler roller 103 and thus longitudinally of the machine over idler rollers 104 and 105 and is connected to the carriage L as at 106. Thus, the reel 102, through the tape 101, constantly tends to move the punch head and carriage L from right to left along the lower edge of the card.

A positioning lug 107 is fixed on the tape 101 and is adapted to engage an abutment 108 fixed on the upper punch head and carriage U so that when the upper punch head and carriage U is at the end of its stroke opposite the position X in Fig. 1 and the lower punch head and carriage L is at the opposite end of its stroke from the position XX in Fig. 1, the abutment 108 will be in engagement with the lug 107. The operator then, by grasping a clip 109, sweeps or moves the carriage L to the position XX, which is the starting position of the machine. In so doing, the rear flight of the tape 101 moves in the opposite direction from the carriage L and the lug 107 engages the clip or abutment 108 and moves the carriage U to the position X, at which point it releases it due to the fact that the lug 107 will reach the roller 104 and disengage from the abutment or clip 108, thus releasing the upper carriage U for movement from left to right by operation of the escapement mechanism, as previously described.

The upper flight of the tape 101 is latched from movement from left to right to move the carriage L from the position XX until the carriage U has reached the end of its stroke opposite the position X. This latching is effected by a one-way spring-pressed pivotal latch lever 110 which normally permits movement of the upper flight of the tape 101 from right to left, but automatically latches it against movement from left to right. This latch lever 110 cooperates with a vertical wall 111 which is perpendicular to the platform 38 and depends therefrom, as illustrated in Fig. 2.

However, as the upper carriage U reaches the end of its stroke opposite the position X, the punch head 21 thereof engages the latch lever 110 and releases the tape 101 automatically enabling movement of the lower carriage L from right to left by operation of its escapement mechanism as previously described. Obviously, the spring reel 102 exerts a constant tendency, through the tape 101, to effect this movement.

The above operation of the two carriages is diagrammatically illustrated in Fig. 7, and it should be understood that this figure is purely diagrammatic as far as the relationship of the parts is concerned, they being shown in an unnatural position in order that their operation may be explained.

It is seen that the platform 38 is formed with opposite openings 112 therein adjacent the punch heads to accommodate the movement thereof. The ends of these openings 112 define the approximate ends of the strokes of the two die heads and their associated carriages 19.

By reference to the drawings, it will be seen that the platform 38 at the left end thereof is formed with a depression 113, the bottom of which is spaced below the card receiving platform 38. At opposite sides of this depression and between the openings 112, fixed end guides 114 are provided to receive one card end. At the opposite end of the platform 38, to receive the opposite end of the card, an operable latching member 115 is provided, as illustrated in Figs. 1 and 2. This latch 115 is operated by a button 116 connected therewith through a lever 117 and a pair of links 118. When this button 116 is in its farthest position to the left, a spring 119 spring presses the latch 115 toward the card receiving platform 38 and will latch an interposed card thereto. When the button 116 is moved in the opposite direction, the tension of the spring 119 is overcome and the latch 115 is elevated to release the card.

Therefore, to position a card in place, it is placed on the platform and its left end is inserted under the guides 114, as shown in Figs. 1 and 2. The other end of the card is then moved to the left by buckling the card and its right end is then slipped under the latch 115, at which time the button 116 has been moved by the operator to its forwardmost position. The card, after its right end has been inserted under the latch 115, may lie flatwise on the platform 38 and the button 116 released so that the latch member 115 will clamp the card to the platform 38.

During this time the lower longitudinal edge of the card will have been aligned by the operator against a card gauge member 120, which is connected to the lower carriage L and projects at the right-hand side thereof. When the carriage and punch head L is in the position at the opposite end of its stroke from position XX in Fig. 1, the gauge member will be disposed substantially centrally between the latch 115 and guides 114 so that the lower edge of the card may be aligned thereagainst and properly position on the platform for operation. The gauge member 120 is guided in the frame guide 12 by the track and the groove which serve the same purpose for the lower carriage L. The connection between the lower carriage L and the card gauge 120 is such that when the machine is set to commence operation and the lower carriage L is moved to the position XX, the card gauge 120 will be moved to an ineffective position therewith, as illustrated in Fig. 1.

It will be seen that the card gauge member 120 has ears 121 projecting laterally inward at each end thereof adapted to be engaged by a member 122 fixed to the punch head of the lower carriage L. In moving the lower carriage L from the position XX, there is a certain amount of lost motion before the member 122 engages the left-hand ear 121 of the gauge 120. This is so that when the lower carriage L is in a position at the opposite end of its stroke, that the gauge member 120 will be positioned as shown in broken lines in Fig. 1, approximately centrally between the ends of the card.

There is likewise a similar amount of lost motion when the lower carriage L moves from left to right before the lower carriage commences moving the gauge member 120 out of position in engagement with the card, and moves it to the position shown in Fig. 1, where it is ineffective. However, the gauge member 120 is always positioned to engage the card when the lower carriage L is in the end of its stroke opposite the position XX, at which time a card to be operated upon is positioned on the frame and held thereon by the card holding means heretofore described.

Thus, in operation of my invention, assuming that the parts are in the position shown in Fig. 1, the carriage U, which is a punch carrying carriage, is positioned at the position X in register with the left-hand field of the upper edge of the card. If it is desired to notch a numeral into this field, the appropriate key is depressed to actuate the dies of the carriage U, as previously set forth, which will properly notch the selected number into the card.

If one of the numbers "1" to "9" is to be notched into the card, the escapement mechanism is automatically actuated in synchronism with the punch operation to actuate the escapement mechanism so that the carriage U will be shifted to register with the next succeeding position or field on the card. If, however, no notching is to be made into the field so that the same will indicate zero, then the zero button is depressed, which, as previously described, independently actuates the escapement mechanism to permit the carriage operating mechanism to shift or advance the carriage to its succeeding position in register with the succeeding field of the upper longitudinal card edge. Notching of the fields is then continued until the entire card edge is notched and the carriage U arrives at the end of its stroke opposite the position X, or at the end of the slot or opening 112.

As it reaches the end of its operating stroke, the carriage U engages the latch lever 110 and releases the tape 101 so that the latter will be made effective in moving the carriage L to the left when permitted by the escapement mechanism. The carriage L is shifted from its position XX until it registers with the first field at the right-hand lower edge of the card which is actually the first field on that edge, because in use the edge of the card being analyzed or sorted is held uppermost. The keys are then actuated in proper fashion, as described in connection with the carriage U, to notch the lower edge of the card, and when it has completed notching the lower edge of the card, it assumes the position at the opposite end of its stroke from the position XX. At this time both longitudinal edges of the card have been completely notched and the card is removed by manipulation of the button 116 to release the card latch 115, and a succeeding card is substituted therefor for notching.

It should be pointed out here that the positioning lug 107 on the tape 101 may pass to the right over the clip 108 due to its cam shape and its inherent spring qualities, so that by the time the lower carriage L reaches the end of its operating stroke, the lug 107 will have passed over the clip 108 and be ready for a subsequent operation.

As previously described, the operator then grasps the carriage L and moves it to the position XX, during which movement the lug 107 will engage the clip 108 and move the carriage U to the position X in Fig. 1. As it reaches this position, the lug 107 becomes disengaged from the clip 108 in that it moves laterally away therefrom due to partial passage over the roller or idler 104. The machine is then conditioned for a successive operation on the succeeding card.

It is desired to point out here that one of the advantages of the present machine is that the entire area of the card, except for that portion of the area covered by the punch block which is in operation, is within full view of the operator of the machine so that the operator has the full benefit of any intelligence which may be imprinted on the card, as well as being able to see the notches immediately after they have been formed into the card.

It is also desired to emphasize here that although only three male die members are employed, there are in fact four dies, which are "1," "2," "4" and "7," and that there are nine keys employed for operating these dies. That is to say, although it is desired to notch in numbers "1" to "9," inclusive, into a field of a card, I need only employ four dies. It is seen that four of the keys selectively and individually operate the four dies, while the remaining keys operate the dies in selected combinations to indicate the remaining numbers.

I also want to point out that a single set of nine keys actuates similar dies on both heads simultaneously. This, of course, is much in the interest of simplicity, not only of construction but of operation.

One of the features of the invention is, of course, the ability to notch out both longitudinal edges of a card with one positioning of the card in the machine. This saves card handling and is much in the interest of the efficiency of the machine and the rapid notching of cards.

While I have shown the preferred form of a machine for practicing my invention, I wish it understood that various changes may be made in its construction by those skilled in the art without departing from the spirit of the invention as defined in the appended claims.

Having thus described my invention, what I claim and desire to secure by Letters Patent is:

1. A machine of the character described comprising a frame, guide means on the frame, means for holding a card on the frame in a predetermined position thereon relative to the guide means, a punch and die carrying carriage mounted in the guide means in operative relation to the edge of a card supported on the frame, carriage operating means for advancing said carriage step by step through a plurality of predetermined positions along the edge of the card, selective key operated means for actuating the punches of the carriage at each position, and means operative in synchronism with the key operated means for actuating the carriage operating means to advance the carriage to a succeeding position upon each operation of the key operated means.

2. A machine of the character described comprising a frame, guide means on the frame, means for holding a card on the frame in a predetermined position thereon relative to the guide means, a punch and die carrying carriage mounted in the guide means in operative relation to the edge of a card supported on the frame, carriage operating means for advancing said carriage step by step through a plurality of predetermined positions along the edge of the card, selective key operated means for actuating the punches of the carriage at each position, and means operative in synchronism with the key operated means for actuating the carriage operating means to advance the carriage to a succeeding position upon each operation of the key operated means, other means for actuating the carriage operating means independently of the key operated means to advance the carriage.

3. In a machine of the character described, a frame, means for stationarily holding a card in a predetermined position on the frame, guide means on the frame, a punch and die carrying carriage movable in the guide means along one edge of a card stationarily positioned on the frame, punches and dies carried by the carriage and positioned thereby in a predetermined position with relation to the card edge to operate thereon, means for moving said carriage step by step through a plurality of predetermined positions along the card edge whereby the punches may operate on the same at each of said positions, selective key operated means operatively associated with the punches to actuate the same at any one of said positions.

4. In a machine of the character described, a frame, means for stationarily holding a card in a predetermined position on the frame, guide means on the frame, a punch and die carrying carriage movable in the guide means along one edge of a card stationarily positioned on the frame, punches and dies carried by the carriage and positioned thereby in a predetermined position with relation to the card edge to operate thereon, means for moving said carriage step by step through a plurality of predetermined positions along the card edge whereby the punches may operate on the same at each of said positions, selective key operated means operatively associated with the punches to actuate the same at any one of said positions, and means operating in synchronism with the key operated means for actuating the carriage operating means to advance the carriage to a succeeding position upon each operation of the punches.

5. In a machine of the character described, a frame, means for stationarily holding a card in a predetermined position on the frame, guide means on the frame, a punch and die carrying carriage movable in the guide means along one edge of a card stationarily positioned on the frame, punches and dies carried by the carriage and positioned thereby in a predetermined position with relation to the card edge to operate thereon, means for moving said carriage step by step through a plurality of predetermined positions along the card edge whereby the punches and dies may operate on the same at each of said positions, selective key operated means operatively associated with the punches to actuate the same at any one of said positions, means operating in synchronism with the key operated means for actuating the carriage operating means to advance the carriage to a succeeding position upon each operation of the punches and dies, and means independent of the key operated means for actuating the carriage operating means to move the carriage from one position to a succeeding one.

6. A machine of the character described comprising a frame, means for stationarily holding a card on the frame, guide means fixed on the frame, a punch and die carrying carriage mounted in the guide means in operative relation to the edge of a card on the frame for punching the same, selective key operated means for actuating the punches of the carriage, escapement mechanism associated with the carriage and the frame for advancing said carriage step by step through a plurality of positions along the edge of said card.

7. A machine of the character described comprising a frame, means for stationarily holding a card on the frame, guide means fixed on the frame, a punch and die carrying carriage mounted in the guide means in operative relation to the edge of a card on the frame for punching the same, selective key operated means for actuating the punches of the carriage, escapement mechanism associated with the carriage and the frame for advancing said carriage step by step through a plurality of positions along the edge of the card, and means automatically operating upon each operation of the punches to actuate the escapement mechanism to advance said carriage from one position to the succeeding position.

8. A machine of the character described comprising a frame, means for stationarily holding a card on the frame, guide means fixed on the frame, a punch and die carrying carriage mounted in the guide means in operative relation to the edge of a card on the frame for punching the same, selective key operated means for actuating the punches of the carriage, escapement mechanism associated with the carriage and the frame for advancing said carriage step by step through a plurality of positions along the edge of the card, means automatically operating upon each operation of the punches to actuate the escapement mechanism to advance said carriage from one position to the succeeding position, and means independent of the first named means for actuating the escapement mechanism to advance said carriage from one position to a succeeding one.

9. A machine of the character described comprising a frame, card holding means on the frame for holding a card thereon in a predetermined position, a pair of guide means on the frame extending parallel to the opposite side edges of a card in the card holding means, a punch and die carrying carriage mounted in each guide means for operation on the adjacent edge of the card, similar punches and dies carries by said carriages for operation on a card in the card holding means, a single set of operable keys associated with the punches of both sets, and means operatively associated with the keys and punches whereby operation of a key will operate its associated punches of both sets.

10. A machine of the character described comprising a frame, card holding means on the frame for holding a card thereon in a predetermined position, guide means on the frame extending parallel to the opposite side edges of a card in the card holding means, a punch and die carrying carriage mounted in each guide means for operation on the adjacent edge of the card, similar punches and dies carried by said carriages for operation on a card in the card holding means, a single set of operable keys associated with certain punches of both sets, means operatively associated with the keys and punches whereby operation of a key will operate its associated punches of both sets, an operative connection between said carriages whereby they will alternately operate along their related card edges.

11. A machine of the character described comprising a frame, card holding means on the frame for holding a card thereon in a predetermined position, a pair of guide means on the frame extending parallel to the opposite side edges of a card in the card holding means, a punch and die carrying carriage mounted in each guide means for operation on the adjacent edge of the card, similar punches and dies carried by said carriages for operation on a card in the card holding means, a single set of operable keys associated with certain punches of both sets, means operatively associated with the keys and punches whereby operation of a key will operate its associated punches of both sets, an operative connection between said carriages whereby they will alternately operate along their related card edges, an escapement mechanism associated with each carriage and its associated guide for advancing the carriage which is in operation step by step through a plurality of positions along the card edge, and means operating automatically for actuating said escapement mechanism each time a key is operated to effect operation of a die.

12. A machine of the character described comprising a frame, card holding means on the frame for holding a card thereon in a predetermined position, a pair of guide means on the frame extending parallel to the opposite side edges of a card in the card holding means, a punch and die carrying carriage mounted in each guide means for operation on the adjacent edge of the card, similar punches and dies carried by said carriages for operation on a card in the card holding means, a single set of operable keys associated with certain punches of both sets, means operatively associated with the keys and punches whereby operation of a key will operate its associated punches of each set, an operative connection between said carriages whereby they will alternately operate along their related card edges, an escapement mechanism associated with each carriage and its associated guide for advancing the carriage which is in operation step by step through a plurality of positions along the card edge, means operating automatically for actuating said escapement mechanism each time a key is operated to effect operation of a punch, and means for independently operating the escapement mechanism to advance the carriage from one position to a succeeding position.

13. A machine of the character described, a frame, card holding means for stationarily holding a card on the frame in a predetermined position thereon, a guide on the frame, a punch and die carrying carriage movable on the frame and guided by the guide means along one edge of a card held by the card holding means, a number of punches and dies carried by the carriage for notching the card edge as the carriage traverses the card edge, a number of keys for operating the punches, the number of keys being greater than the number of the punches, operative connections between a number of the keys equal to the number of the punches and the punches for individually operating said punches, and operative connections between the remainder of the keys and said punches whereby each of the remainder of the keys will operate said punches in selective combinations.

14. A machine of the character described, a frame, card holding means for stationarily holding a card on the frame in a punch and predetermined position thereon, a guide on the frame, a die carrying carriage movable on the frame and guided by the guide means along one edge of a card held by the card holding means, a number of punches and dies carried by the carriage for notching the card edge as the carriage traverses the card edge, carriage operating means for moving said carriage intermittently along the card edge from one predetermined position to a succeeding predetermined position thereon, a number of keys for operating the punches, the number of keys being greater than the number of the dies, operative connections between a number of the keys equal to the number of the punches and the punches for individually operating said punches, and operative connections between the remainder of the keys and said punches whereby each of the remainder of the keys will operate said punches in selective combinations.

15. A machine of the character described, a frame, card holding means for stationarily holding a card on the frame in a predetermined position thereon, a guide on the frame, a punch and die carrying carriage movable on the frame and guided by the guide means along one edge of a card held by the card holding means, a number of punches and dies carried by the carriage for notching the card edge as the carriage traverses the card edge, carriage operating means for moving said carriage intermittently along the card edge from one predetermined position to a succeeding predetermined position thereon, a number of keys for operating the punches, the number of keys being greater than the number of the punches, operative connections between a number of the keys equal to the number of the punches and the punches for individually operating said punches, operative connections between the remainder of the keys and said punches whereby each of the remainder of the keys will operate said punches in selective combinations, means automatically operating upon the operation of a key to actuate the carriage operating means to advance the carriage to a succeeding position.

16. A machine of the character described, a frame, card holding means for stationarily holding a card on the frame in a predetermined position thereon, a guide on the frame, a punch and die carrying carriage movable on the frame and guided by the guide means along one edge of a card held by the card holding means, a number of punches and dies carried by the carriage for notching the card edge as the carriage traverses the card edge, escapement mechanism associated with the carriage and frame for intermittently advancing said carriage step by step successively from one position to a succeeding position along the card edge, a number of keys for operating said punches, the number of keys being greater than the number of the punches, operative connections between a number of the keys equal to the number of the punches and the punches for individually operating said punches, operative connections between the remainder of the keys and said punches whereby each of the remainder of the keys will operate said punches in selective combinations, means operative upon each operation of a key to actuate the escapement mechanism to advance the carriage to a succeeding position.

17. A machine of the character described, a frame, card holding means for stationarily holding a card on the frame in a predetermined position thereon, a guide on the frame, a punch and die carrying carriage movable on the frame and guided by the guide means along one edge of a card held by the card holding means, a number of punches and dies carried by the carriage for notching the card edge as the carriage traverses the card edge, carriage operating means for moving said carriage intermittently along the card edge from one predetermined position to a succeeding predetermined position thereon, a number of keys for operating the punches, the number of keys being greater than the number of the punches, operative connections between a number of the keys equal to the number of the punches and the punches for individually operating said punches, operative connections between the remainder of the keys and said punches whereby each of the remainder of the keys will operate said punches in selective combinations, means automatically operating upon the operation of a key to actuate the carriage operating means to advance the carriage to a succeeding position, and other means for actuating the carriage operating means for advancing the carriage from one position to a succeeding position.

18. A machine of the character described, a frame, card holding means for stationarily holding a card on the frame in a predetermined position thereon, a guide on the frame, a punch and die carrying carriage movable on the frame and guided by the guide means along one edge of a card held by the card holding means, a number of punches and dies carried by the carriage for notching the card edge as the carriage traverses the card edge, escapement mechanism associated with the carriage and frame for intermittently advancing said carriage step by step successively from one position to a succeeding position along the card edge, a number of keys for operating the punches, the number of keys being greater than the number of the punches, operative connections between a number of the keys equal to the number of the punches and the punches for individually operating said punches, operative connections between the remainder of the keys and said punches whereby each of the remainder of the keys will operate said punches in selective combinations, means operative upon each operation of a key to actuate the escapement mechanism to advance the carriage to a succeeding position, and independent key operated means associated with the escapement mechanism for actuating the same to advance the carriage from one position to a succeeding one independently of the operation of the other keys.

LINCOLN M. KEEFE.

REFERENCES CITED

The following references are of record in the file of this patent:

UNITED STATES PATENTS

| Number | Name | Date |
| --- | --- | --- |
| 1,669,765 | Langford | May 15, 1928 |
| 2,342,516 | Nevin | Feb. 22, 1944 |
| 2,363,314 | Golber | Nov. 21, 1944 |
| 1,182,309 | Peirce | May 9, 1916 |
| 1,272,089 | Powers | July 9, 1918 |
| 1,506,381 | Peirce | Aug. 26, 1924 |
| 2,041,085 | Nevin | May 19, 1936 |
| 1,300,491 | Schaaff | Apr. 15, 1919 |
| 2,265,229 | Gollwitzer | Dec. 9, 1941 |

FOREIGN PATENTS

| Number | Country | Date |
| --- | --- | --- |
| 587,155 | German | Nov. 2, 1933 |